United States Patent
Abe et al.

(10) Patent No.: US 9,586,285 B2
(45) Date of Patent: Mar. 7, 2017

(54) METHOD AND APPARATUS FOR MANUFACTURING THREE-DIMENSIONAL SHAPED OBJECT

(71) Applicant: PANASONIC INTELLECTUAL PROPERTY MANAGEMENT CO., LTD., Osaka (JP)

(72) Inventors: Satoshi Abe, Osaka (JP); Masataka Takenami, Osaka (JP); Isamu Matsumoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 58 days.

(21) Appl. No.: 14/439,494

(22) PCT Filed: Jul. 9, 2014

(86) PCT No.: PCT/JP2014/068847
§ 371 (c)(1),
(2) Date: Apr. 29, 2015

(87) PCT Pub. No.: WO2015/005497
PCT Pub. Date: Jan. 15, 2015

(65) Prior Publication Data
US 2015/0290741 A1    Oct. 15, 2015

(30) Foreign Application Priority Data
Jul. 10, 2013    (JP) .................................. 2013-144281

(51) Int. Cl.
*B23K 26/16*    (2006.01)
*B23K 26/00*    (2014.01)
(Continued)

(52) U.S. Cl.
CPC ........ *B23K 26/0093* (2013.01); *B22F 3/1055* (2013.01); *B22F 3/162* (2013.01);
(Continued)

(58) Field of Classification Search
CPC ... B23K 26/0093; B23K 26/16; B22F 3/1055; B22F 2003/1056; B22F 2003/247; B29C 67/0077
(Continued)

(56) References Cited

U.S. PATENT DOCUMENTS 5,597,589 A    1/1997    Deckard
7,347,682 B2    3/2008    Lohner et al.
(Continued)

FOREIGN PATENT DOCUMENTS

CN    1347783    5/2002
CN    101511509    8/2009
(Continued)

OTHER PUBLICATIONS

Search report from PCT/JP2014/068847, mail date is Oct. 14, 2014 with English Language Translation.
(Continued)

*Primary Examiner* — Jessee Roe
*Assistant Examiner* — Anthony Liang
(74) *Attorney, Agent, or Firm* — Greenblum & Bernstein, P.L.C.

(57) ABSTRACT

There is provided a selective laser sintering method capable of reducing the trouble in chipping or breakage of the machining tool and the like. The manufacturing method according to an embodiment of the present invention is a method for manufacturing a three-dimensional shaped object by repetition of a powder-layer forming and a solidified-layer forming, the repetition including the steps of (i) forming a solidified layer by irradiating a predetermined
(Continued)

portion of a powder layer with a light beam, thereby allowing a sintering of the powder in the predetermined portion or a melting and subsequent solidification thereof, and (ii) forming another solidified layer by newly forming a powder layer on the resulting solidified layer, followed by the irradiation of a predetermined portion of the powder layer with the light beam.

9 Claims, 14 Drawing Sheets

(51) Int. Cl.
  *B22F 3/24* (2006.01)
  *B29C 67/04* (2006.01)
  *C04B 35/64* (2006.01)
  *B28B 1/00* (2006.01)
  *B29C 67/00* (2006.01)
  *B33Y 40/00* (2015.01)
  *B22F 3/105* (2006.01)
  *B22F 3/16* (2006.01)
  *C04B 35/622* (2006.01)
  *B29L 31/00* (2006.01)

(52) U.S. Cl.
  CPC ............... *B22F 3/24* (2013.01); *B23K 26/16* (2013.01); *B28B 1/001* (2013.01); *B29C 67/0077* (2013.01); *B29C 67/0085* (2013.01); *B29C 67/04* (2013.01); *B33Y 40/00* (2014.12); *C04B 35/622* (2013.01); *C04B 35/64* (2013.01); *B22F 2003/1056* (2013.01); *B22F 2003/247* (2013.01); *B22F 2998/10* (2013.01); *B29L 2031/772* (2013.01); *C04B 2235/6026* (2013.01); *C04B 2235/612* (2013.01); *C04B 2235/665* (2013.01); *Y02P 10/295* (2015.11)

(58) Field of Classification Search
  USPC ........................................... 419/28; 264/497
  See application file for complete search history.

(56) References Cited

U.S. PATENT DOCUMENTS

| | | | |
|---|---|---|---|
| 7,740,797 | B2 | 6/2010 | Abe et al. |
| 8,329,092 | B2 | 12/2012 | Fuwa et al. |
| 8,974,727 | B2 | 3/2015 | Abe et al. |
| 9,073,264 | B2 | 7/2015 | Abe et al. |
| 2002/0041818 | A1 | 4/2002 | Abe et al. |
| 2003/0062655 | A1 | 4/2003 | Lohner et al. |
| 2008/0286139 | A1 | 11/2008 | Abe et al. |
| 2011/0123383 | A1 | 5/2011 | Fuwa et al. |
| 2012/0251378 | A1 | 10/2012 | Abe et al. |
| 2013/0075575 | A1 | 3/2013 | Abe et al. |

FOREIGN PATENT DOCUMENTS

| | | |
|---|---|---|
| CN | 102029389 | 4/2011 |
| CN | 102574333 | 7/2012 |
| CN | 102939177 | 2/2013 |
| DE | 8120988 | 1/1982 |
| DE | 10148967 | 4/2002 |
| EP | 2281677 | 2/2011 |
| JP | 01-502890 | 10/1989 |
| JP | 10-044248 | 2/1998 |
| JP | 10-044270 | 2/1998 |
| JP | 2000-073108 | 3/2000 |
| JP | 2001-87977 | 4/2001 |
| JP | 2002-115004 | 4/2002 |
| JP | 2004-506097 | 2/2004 |
| JP | 2004-082556 | 3/2004 |
| JP | 2006-124733 | 5/2006 |
| JP | 2008-106319 | 5/2008 |
| JP | 2008-291315 | 12/2008 |
| JP | 2008-291317 | 12/2008 |
| JP | 2010-280173 | 12/2010 |
| WO | 88/02677 | 4/1988 |

OTHER PUBLICATIONS

Search report from PCT/JP2014/068846, mail date is Oct. 14, 2014 with English Language Translation.
Japan Office action, mail date is Jul. 15, 2014 with English Language Translation.
Japan Office action, mail date is May 7, 2014 with English Language Translation.
U.S. Appl. No. 14/439,523.
Korean Office Action mailed Jul. 17, 2015 with respect to Korean Patent Application No. 10-2015-7011171.
Written Opinion of the International Searching Authority mailed Jul. 13, 2015 with respect to the International Application No. PCT/JP2014/068847, along with English translation thereof.
Office Action issued in China Counterpart Patent Appl. No. 201480002867.9, dated Sep. 2, 2015, along with an English translation thereof.
Search Report issued by E.P.O. patent office in E.P.O. Patent Application No. 14823771.2, dated Oct. 14, 2015.
Office Action issued in China Counterpart Patent Appl. No. 201480002866.4, dated Nov. 4, 2015, along with an english translation thereof.
Search Report issued by E.P.O. patent office in E.P.O. Patent Application No. 14822306.8, dated Dec. 15, 2015.

Fig. 9A
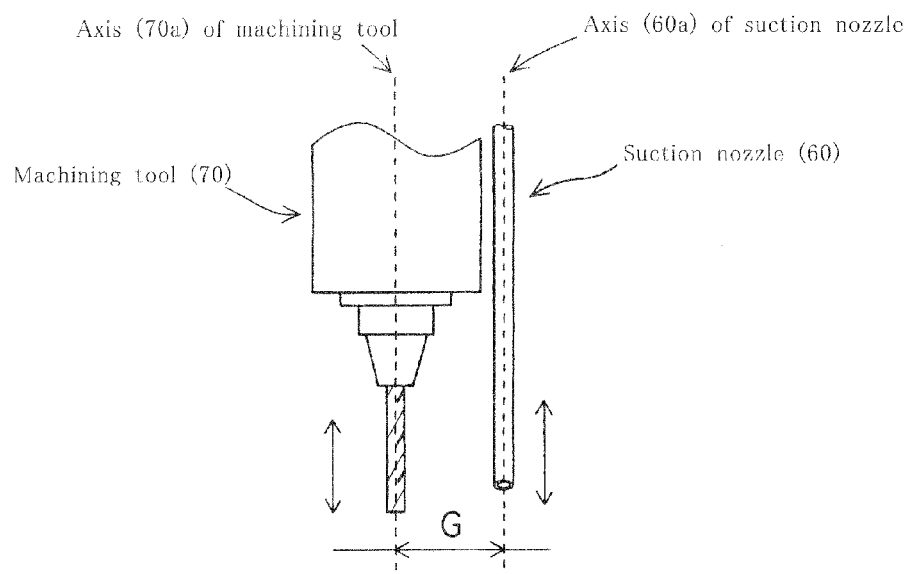
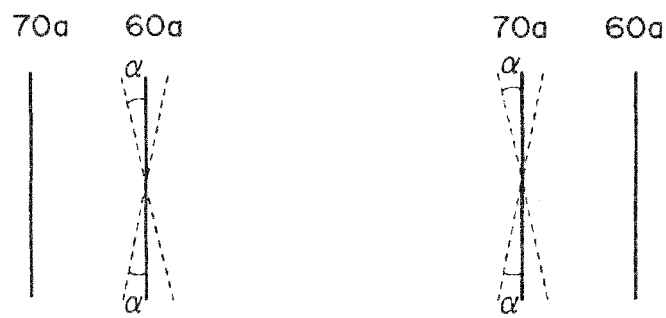
Fig. 9B
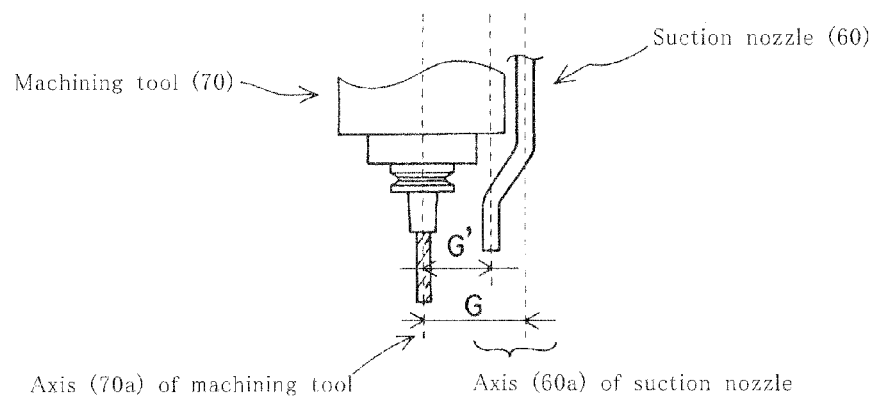

During machining process

Changed configuration of machining device

Machining device with tooling and machining tool having removed therefrom

Changed configuration of machining device

Machining device with dummy tooling attached thereto with no tooling and no machining tool Fig. 11
During surface machining process
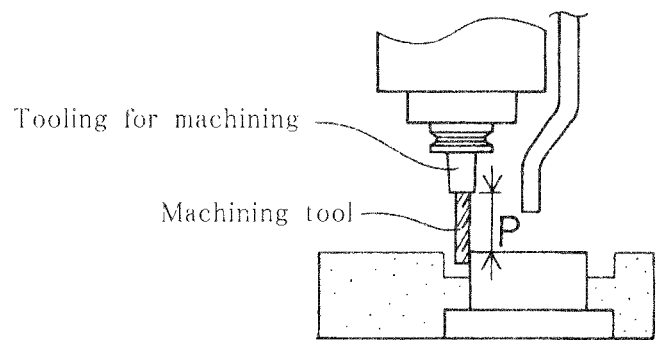
During suction removal process
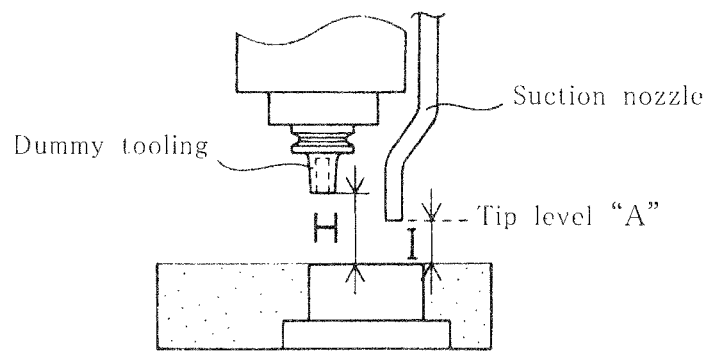

Fig. 12
Purposeful operation of suction nozzle
During machining operation process
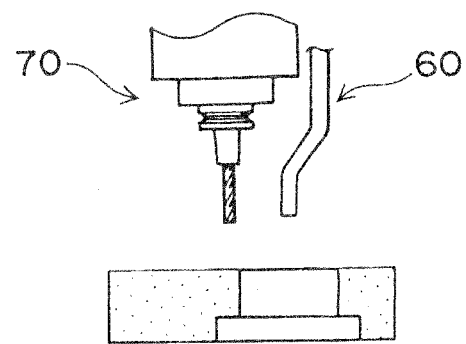
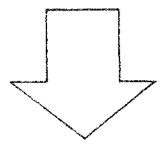
During suction removal process
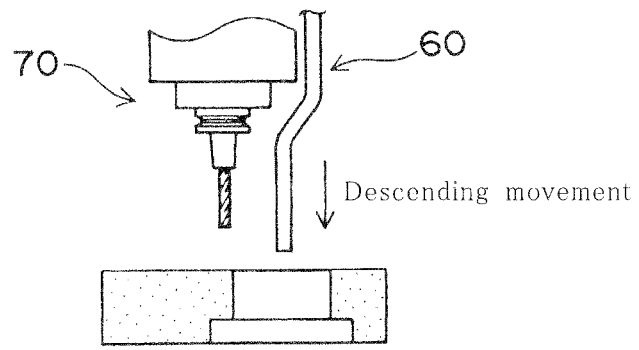

*Fig. 13*
[Suction device for verification test]
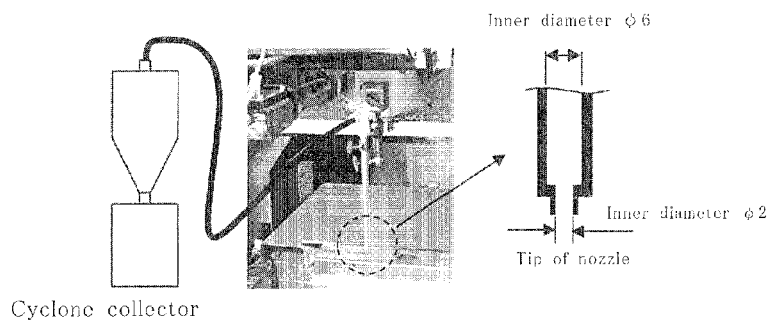
Cyclone collector
Condition of verification test
- Inner diameter of hose: φ6 (Outer diameter: φ8)
- Length of hose: 10m
- Suction amount: 20L/min (Suction by cyclone collector)
- Feed rate of nozzle: 500-2000 mm/s
- Single scanning
- Rib width: 0.4-0.8 mm
- Gap: 0.5-1.0 mm
[Results of verification test]
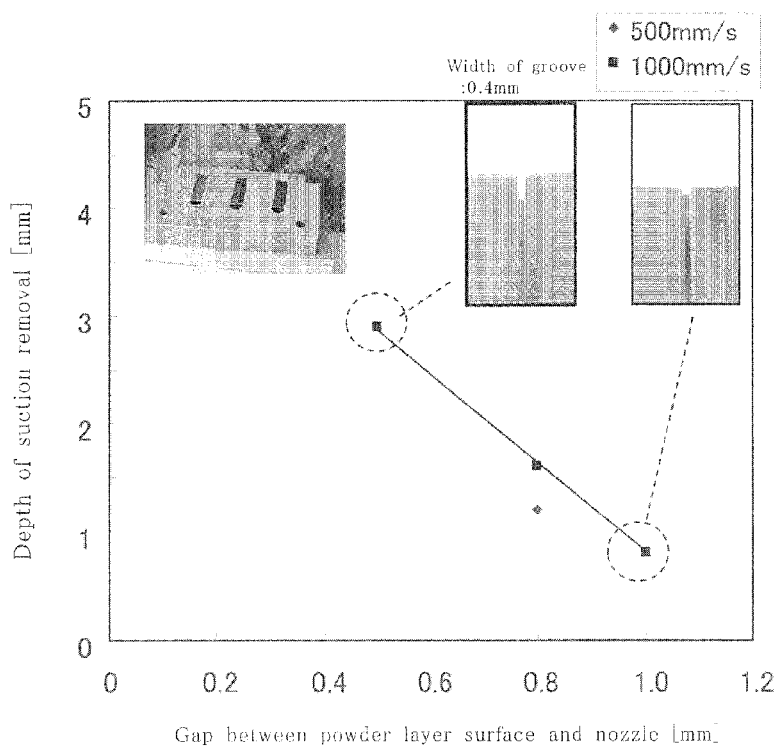

Occurring of stress onto tool due to powder interposition

Influence on surface accuracy by machining performed within the powder layer

METHOD AND APPARATUS FOR MANUFACTURING THREE-DIMENSIONAL SHAPED OBJECT

TECHNICAL FIELD

The present invention relates to a method for manufacturing a three-dimensional shaped object, and also relates to a manufacturing apparatus therefor. More particularly, the present invention relates to a method for manufacturing a three-dimensional shaped object with a plurality of solidified layers stacked integrally by repeating the step of forming a solidified layer by irradiating a predetermined portion of a powder layer with a light beam, and also relates to an apparatus for manufacturing the three-dimensional shaped object.

BACKGROUND OF THE INVENTION

Heretofore, a method for manufacturing a three-dimensional shaped object by irradiating a powder material with a light beam has been known (such method can be generally referred to as "selective laser sintering method"). Such method can produce the three-dimensional shaped object by repeating the following steps (i) and (ii):

(i) forming a solidified layer by irradiating a predetermined portion of a powder layer with a light beam, thereby allowing a sintering of the predetermined portion of the powder or a melting and subsequent solidification thereof; and (ii) forming another solidified layer by newly forming a powder layer on the resulting solidified layer, followed by similarly irradiating the powder layer with the light beam. See JP-T-01-502890 or JP-A-2000-73108, for example.

The three-dimensional shaped object thus obtained can be used as a metal mold in a case where inorganic powder material such as a metal powder and a ceramic powder is used as the powder material. While on the other hand, the three-dimensional shaped object can be used as a model or replica in a case where organic powder material such as a resin powder and a plastic powder is used as the powder material. This kind of technology makes it possible to produce the three-dimensional shaped object with a complicated contour shape in a short period of time.

By way of the case wherein the metal powder is used as the powder material, and the three-dimensional shaped object is used as the metal mold, the selective laser sintering method will be described. As shown in FIGS. 1A and 1B, a powder layer 22 with a predetermined thickness "t1" is firstly formed on a base plate 21 (see FIG. 1A) and then a predetermined portion of the powder layer 22 is irradiated with a light beam to form a solidified layer 24 (see FIG. 1B). Then, another powder layer 22 is newly provided on the solidified layer 24 thus formed, and is irradiated again with the light beam to form another solidified layer. In this way, the solidified layers are repeatedly formed, making it possible to produce a three-dimensional shaped object with a plurality of the solidified layers 24 stacked integrally. The lowermost solidified layer can be formed in a state of being adhered to the surface of the base plate. Therefore, the three-dimensional shaped object and the base plate are mutually integrated. The integrated "three-dimensional shaped object" and "base plate" can be used as the metal mold as they are.

The three-dimensional shaped object obtained by the laser-beam irradiation has a relatively roughened surface. In general, the shaped object has the roughened surface Rz of several hundred micrometers. This is attributed to the fact that the surface of the solidified layer has the adhered powder. When the solidified layer is formed, the energy of the laser beam is changed into heat, which causes the irradiated powder particles to melt. The melted powder particles are fused with each other during the subsequent cooling step thereof. In this regard, the temperature can rise in the surrounding powder region of the irradiated point, and thus such surrounding powder tends to adhere to the surface of the solidified layer. This adherence of the powder causes the roughened surface of the three-dimensional shaped object, and thereby a machining processing of the surface is necessary. Specifically, the surface of the obtained three-dimensional shaped object is wholly required to be subjected to a machining process.

PATENT DOCUMENTS (RELATED ART PATENT DOCUMENTS)

PATENT DOCUMENT 1: Japanese Unexamined Patent Application Publication No. H01-502890
PATENT DOCUMENT 2: Japanese Unexamined Patent Application Publication No. 2000-73108

DISCLOSURE OF THE INVENTION

Problems to be Solved by the Invention

With respect to the selective laser sintering method, the inventors of the present application have found that the presence of the powder around the shaped object can tend to cause a trouble in chipping or breakage of the machining tool (see FIG. 14A). While not intending to be bound by any specific theory, one of the presumed reasons of the chipping or breakage of the machining tool is that an interposition of the powder between the machining tool and the surface of the shaped object increases the stress on the machining tool.

Furthermore, the inventors of the present application have found such a phenomenon that the presence of the powder around the shaped object can cause an unnecessary stress on the surface of the shaped object, and thereby impairing a smoothness of the surface of the shaped object (see FIG. 14B). It is presumed that one of reasons for this phenomenon is also attributed to the interposition of the powder between the machining tool and the surface of the shaped object Under these circumstances, the present invention has been created. That is, an object of the present invention is to provide the selective laser sintering method which is capable of reducing the trouble in chipping or breakage of the machining tool and the like.

Means for Solving the Problems

In order to achieve the above object, one embodiment of the present invention provides a method for manufacturing a three-dimensional shaped object by repetition of a powder-layer forming and a solidified-layer forming, based on the following steps (i) and (ii), the method being characterized by the following features (a)-(c)

(i) forming a solidified layer by irradiating a predetermined portion of a powder layer with a light beam, thereby allowing a sintering of the powder in the predetermined portion or a melting and subsequent solidification thereof; and (ii) forming another solidified layer by newly forming a powder layer on the resulting solidified layer, followed by the irradiation of a predetermined portion of the powder layer with the light beam;

(a) the method includes at least one step of a surface-machining process for machining a surface of the solidified layer and/or the shaped object by a machining device at a point in time after the formation of the solidified layer and/or the manufacturing of the shaped object;

(b) a suction removal of the powder located around the solidified layer and/or the shaped object is performed by a suction nozzle prior to the surface-machining process; and (c) a relative position relationship between a tip level "A" of the suction nozzle and a tip level "B" of the machining device is altered for the suction removal.

In a preferred embodiment, a configuration of the machining device is changed such that the tip level "B" of the machining device is higher than the tip level "A" of the suction nozzle, and thereby achieving the altered relative position relationship between the tip level "A" and the tip level "B". For example, in a case where the machining device comprises a headstock, a tooling and a machining tool, only a dummy tooling attached to the headstock may be provided in the machining device, the dummy tooling being provided instead of the tooling and the machining tool in the machining device. The suction removal is performed under such a condition that the dummy tooling attached to the headstock is provided in the machining device with no tooling and no machining tool. The dummy tooling may be the same in type of that of the tooling, for example. Alternatively, the suction removal is performed under such a condition that only the headstock may be provided in the machining device with the tooling and the machining tool having removed therefrom.

In another preferred embodiment, the suction nozzle is actuated such that the tip level "A" of the suction nozzle is lower than the tip level "B" of the machining device to alter the relative position relationship between the tip level "A" and the tip level "B".

In another preferred embodiment, the suction removal is performed under such a condition that a spaced distance between the powder layer and the tip level "A" of the suction nozzle is within 5 mm, the powder layer being a layer formed most immediately before the suction removal.

In another preferred embodiment, the suction removal is performed under such a condition that the suction nozzle and the machining device are positioned adjacent to each other.

The present invention also provides an apparatus for manufacturing a three-dimensional shaped object in which the aforementioned manufacturing method is carried out. Such apparatus comprises a powder layer former, a light-beam irradiator, a forming table, a suction nozzle and a machining device. The powder layer former is a means for forming a powder layer. The light-beam irradiator is a means for irradiating the powder layer with a light beam to form a solidified layer therefrom. The forming table is a table on which the powder layer and/or the solidified layer are/is formed. The suction nozzle is a device for removing at least a part of the powder of the powder layer by suction. The machining device is a device for subjecting the solidified layer and the three-dimensional shaped object to a surface-machining, the shaped object being formed of the solidified layers. In particular, the apparatus according to an embodiment of the present invention is configured to alter a relative position relationship between a tip level "A" of the suction nozzle and a tip level "B" of the machining device.

In the apparatus according to a preferred embodiment of the present invention, the machining device comprises a headstock, a tooling and a machining tool, and the machining device additionally has a dummy tooling by which the tooling is to be replaced.

In the apparatus according to another preferred embodiment of the present invention, the suction nozzle and the machining device are positioned adjacent to each other such that an axis of the suction nozzle and an axis of the machining device are approximately parallel to each other.

Effect of the Invention

In accordance with an embodiment of the present invention, the powder located around the solidified layer and/or the shaped object can be removed by suction prior to the surface-machining process, and thereby making it possible to reduce the trouble in chipping or breakage of the machining tool, the chipping or breakage being attributed to the interposition of the powder between the machining tool and the surface of the shaped object. Furthermore, an embodiment of the present invention can reduce the interposition of the powder between the machining tool and the surface of the shaped object, and thereby reducing the stress applied on the surface of the shaped object during the machining process. This leads to an improved smoothness of the surface of the shaped object.

The suction removal of the powder by the suction nozzle can be performed only for the local portion of the powder layer. Such local removal of the powder is effective, and is unlikely to have an adverse impact on the manufacturing time of the three-dimensional shaped object. In particular, the suction removal by the suction nozzle is not inhibited by the machining tool, and thereby making it possible to achieve a more efficient suction removal. Specifically, when the horizontal movement of the suction nozzle is provided during the suction removal treatment (for example when the horizontal movement of the suction nozzle is provided in a circular pattern such that the nozzle moves along the cross-sectional contour of the shaped object), the collision between the machining tool and the shaped object can be avoided.

BRIEF DESCRIPTION OF THE DRAWINGS

FIGS. 9A and 9B are schematic views showing an arrangement between a suction nozzle and a machining device.

FIG. 11 includes schematic views associated with an embodiment wherein the dummy tooling is used.

FIG. 12 includes schematic views for explaining an embodiment wherein a purposeful operation of suction nozzle is performed.

FIG. 13 includes illustrations and graph for explaining an experimental result associated with an embodiment of the present invention.

MODES FOR CARRYING OUT THE INVENTION

Figure 1A:
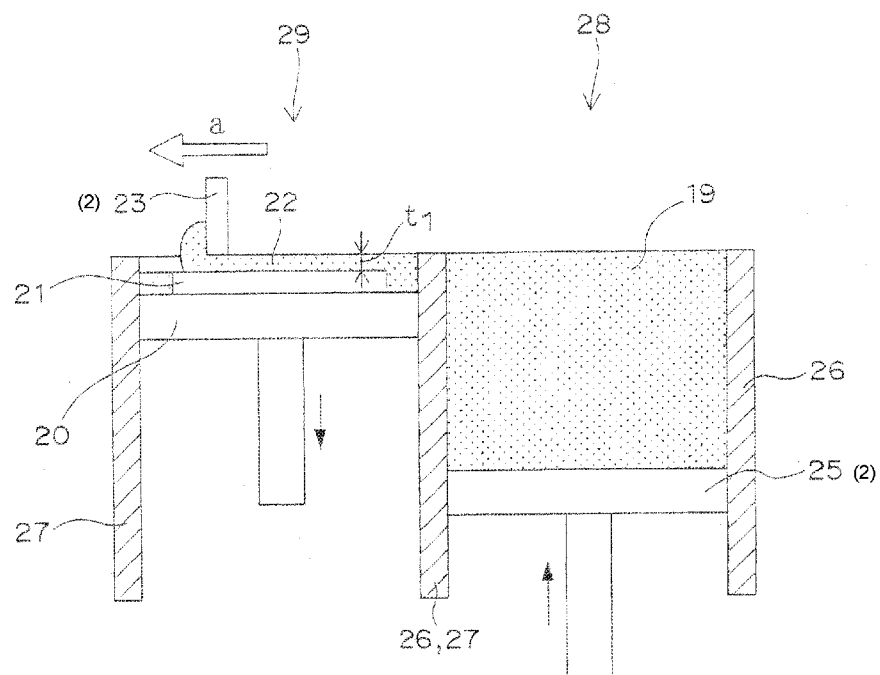
FIGS. 1A and 1B are cross-sectional views for explaining a selective laser sintering method.

An embodiment of the present invention will be described in more detail with reference to the accompanying drawings. It should be noted that configurations/forms and dimensional proportions in the drawings are merely for illustrative purposes, and thus not the same as those of the actual parts or elements.

The term "powder layer" as used in this description and claims means, for example, "metal powder layer made of a metal powder" or "resin powder layer made of a resin powder". Also, the term "predetermined portion of a powder layer" substantially means a portion of a three-dimensional shaped object to be manufactured. Therefore, a powder existing in such predetermined portion is irradiated with a light beam, whereby, the powder undergoes a sintering or a melting and subsequent solidification thereof to form a shape of a three-dimensional shaped object. Furthermore, the term "solidified layer" substantially means "sintered layer" when the powder layer is a metal powder layer, whereas term "solidified layer" substantially means "cured layer" when the powder layer is a resin powder layer.

The term "upper" as used in this description and claims substantially means a stacking direction of the solidified layers upon the manufacturing of the shaped object. While on the other hand, term "lower" as used in this description and claims substantially means the reverse direction to the upper direction. Namely, the lower direction corresponds to a vertical lower direction.

[Selective Laser Sintering Method]

First, a selective laser sintering method, on which an embodiment of the manufacturing method of the present invention is based, will be described. For convenience, the selective laser sintering method, which will be described, is one where a powder material is supplied from a storage tank therefor, followed by being flattened by means of a squeegee blade to form a powder layer therefrom. Moreover, by way of example, the selective laser sintering method wherein a machining process is additionally carried out with respect to the shaped object (i.e., the method embodiment as shown in FIG. 2A, not FIG. 2B) will be described. FIGS. 1A, 1B, 3 and 4 show functions and constructions of a metal laser sintering hybrid milling machine for enabling an execution of the selective laser sintering method as well as a machining process. The laser-sintering/milling hybrid machine 1 is mainly provided with a powder layer former 2, a forming table 20, a base plate 21, a light-beam irradiator 3, and a machining means 4. The powder layer forming means 2 is a means for forming a powder layer by providing a powder such as a metal powder or a resin powder in a predetermined thickness. The forming table 20 is a table capable of vertically elevating/descending by cylinder drive in a forming tank 29 whose outer periphery is surrounded with a wall 27. The base plate 21 is a plate for shaped object, which is disposed on the forming table 20 and serves as a platform of the shaped object. The light-beam irradiation means 3 is a means for irradiating a desired position with an emitted light beam L. The machining means 4 is a means for milling the surface of the shaped object, especially the side face of the shaped object.

Figure 1B:
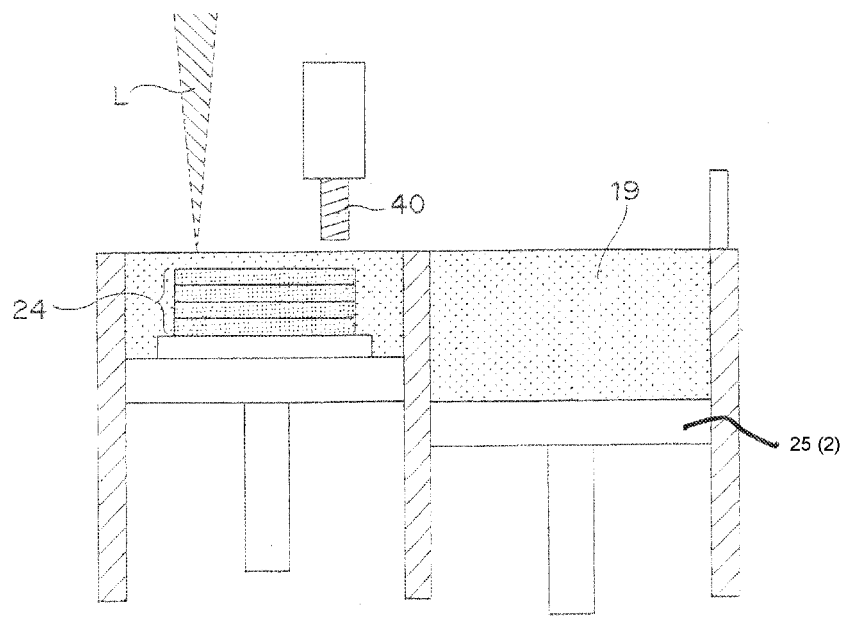
Figure 2A:
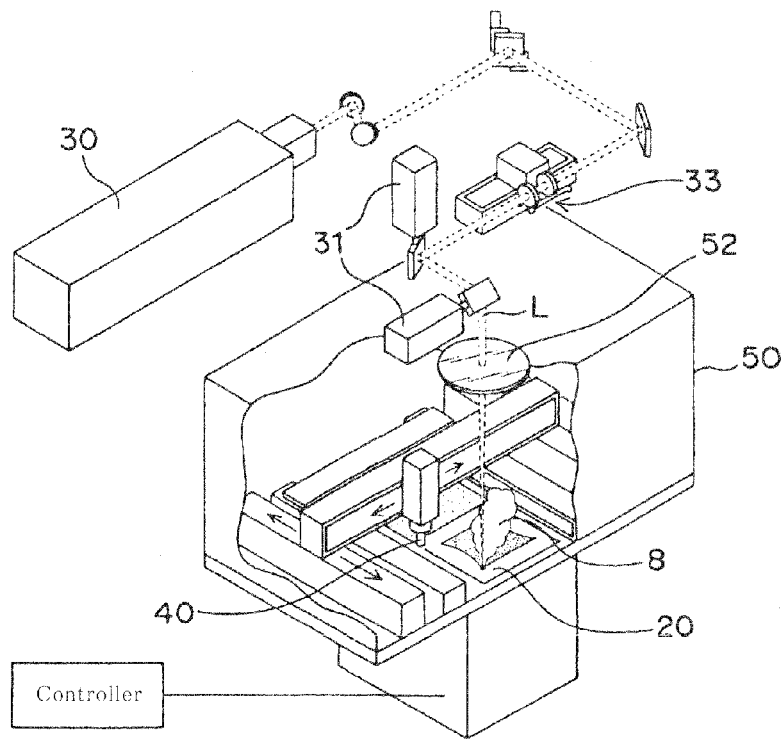
FIGS. 2A and 2B are perspective views schematically illustrating a device for performing a selective laser sintering method wherein FIG. 2A especially shows a laser-sintering/machining hybrid machine with a machining mechanism, and FIG. 2B especially shows a device with no machining mechanism.
Figure 2B:
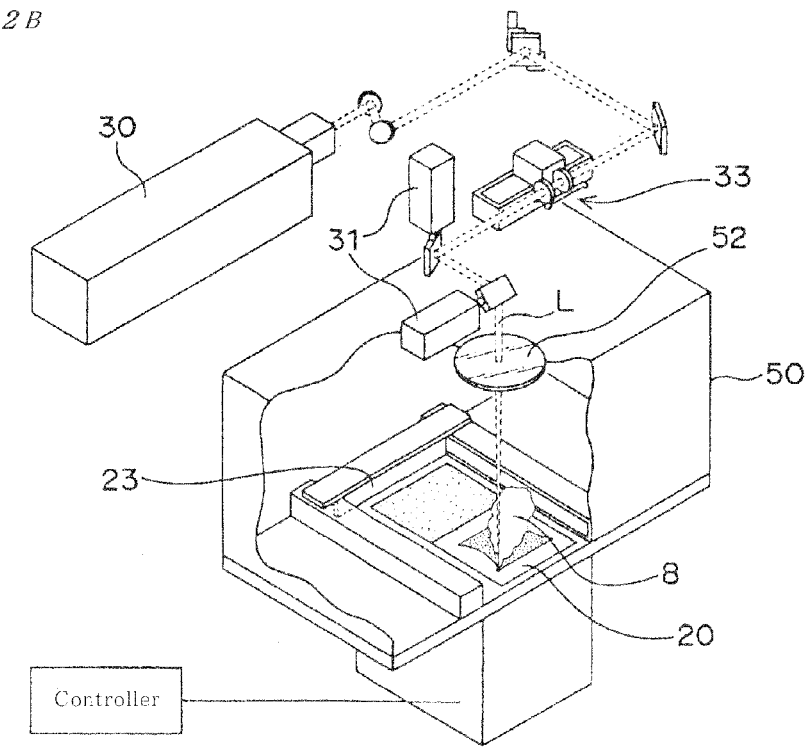
Figure 3:
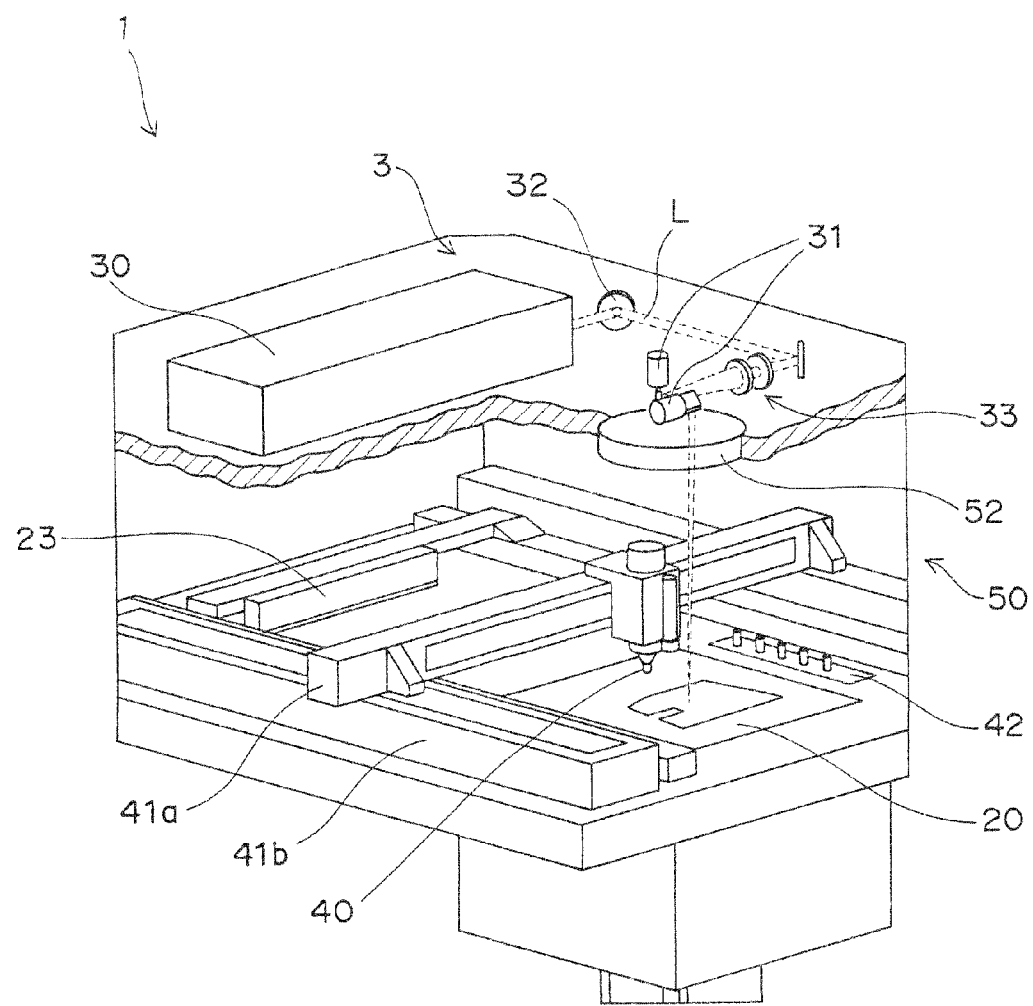
FIG. 3 is a perspective view schematically showing an embodiment in which a selective laser sintering method is carried out.
Figure 4:
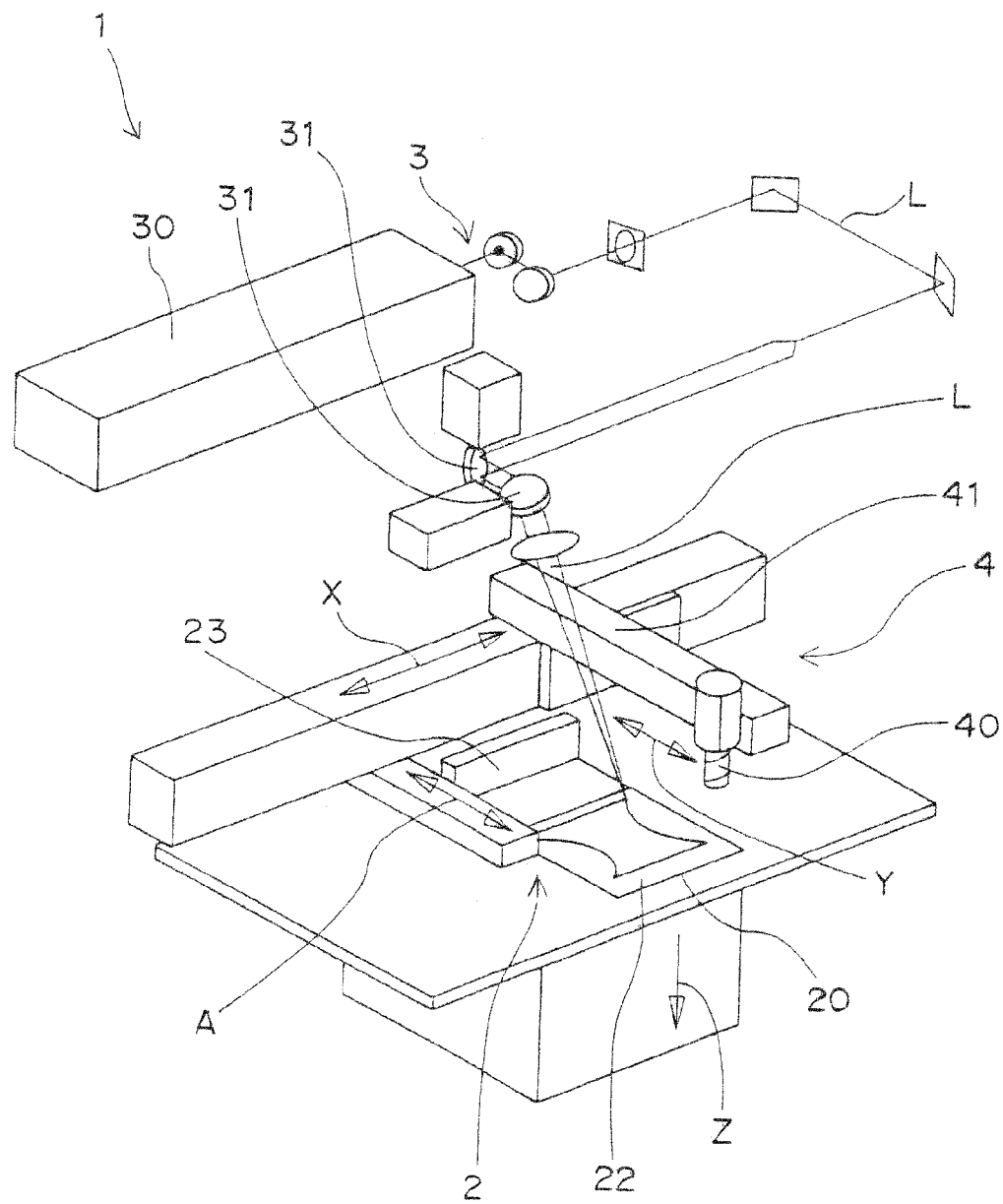
FIG. 4 is a perspective view schematically showing a construction of a machine (laser-sintering/machining hybrid machine) by which the surface machining process as well as a selective laser sintering method is carried out.

As shown in FIGS. 1A and 1B, the powder layer former 2 is mainly composed of a "powder table 25 capable of vertically elevating/descending by cylinder drive in a storage tank for powder material 28 whose outer periphery is surrounded with a wall 26" and a "squeegee blade 23 for forming a powder layer 22 on the base plate for shaped object". As shown in FIGS. 3 and 4, the light-beam irradiator 3 is mainly composed of a "light beam generator 30 for emitting a light beam L" and a "galvanometer mirror 31 (i.e., scan optical system) for scanning a light beam L onto a powder layer 22". Optionally, the light-beam irradiation means 3 is equipped with a beam shape correcting means for correcting a shape of a light beam spot (e.g., a means composed of a pair of cylindrical lens and a rotation drive mechanism for rotating the lens around a shaft line of the light beam) and fθ lens. The machining means 4 is mainly composed of a "milling head 40 for milling the peripheral face of a shaped object" and a "X-Y actuator 41 (41a, 41b) for driving the milling head 40 to move toward the position to be milled" (see FIGS. 3 and 4).

Figure 5:
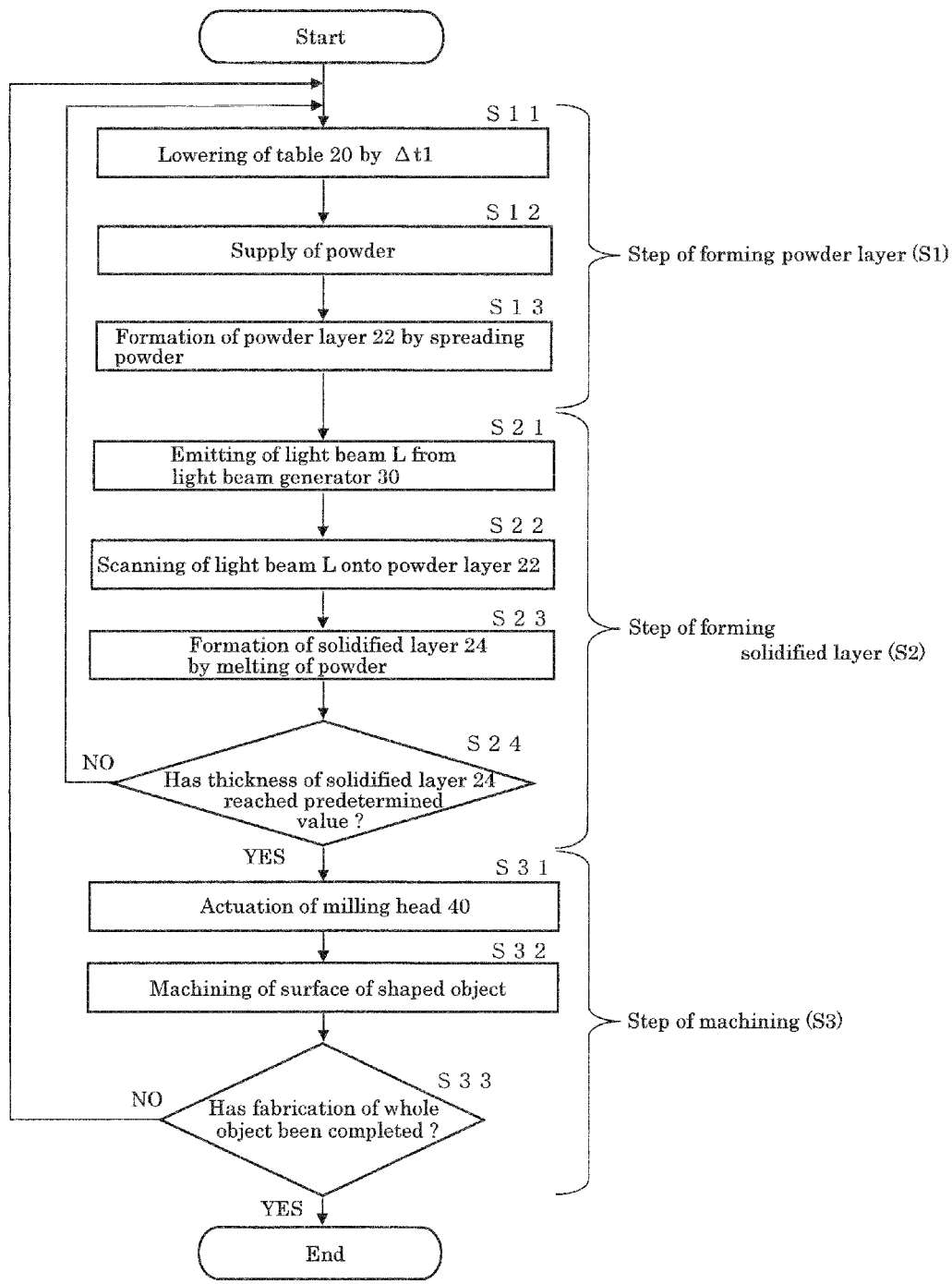
FIG. 5 is a flow chart of operations of a laser-sintering/machining hybrid machine.
Figure 6:
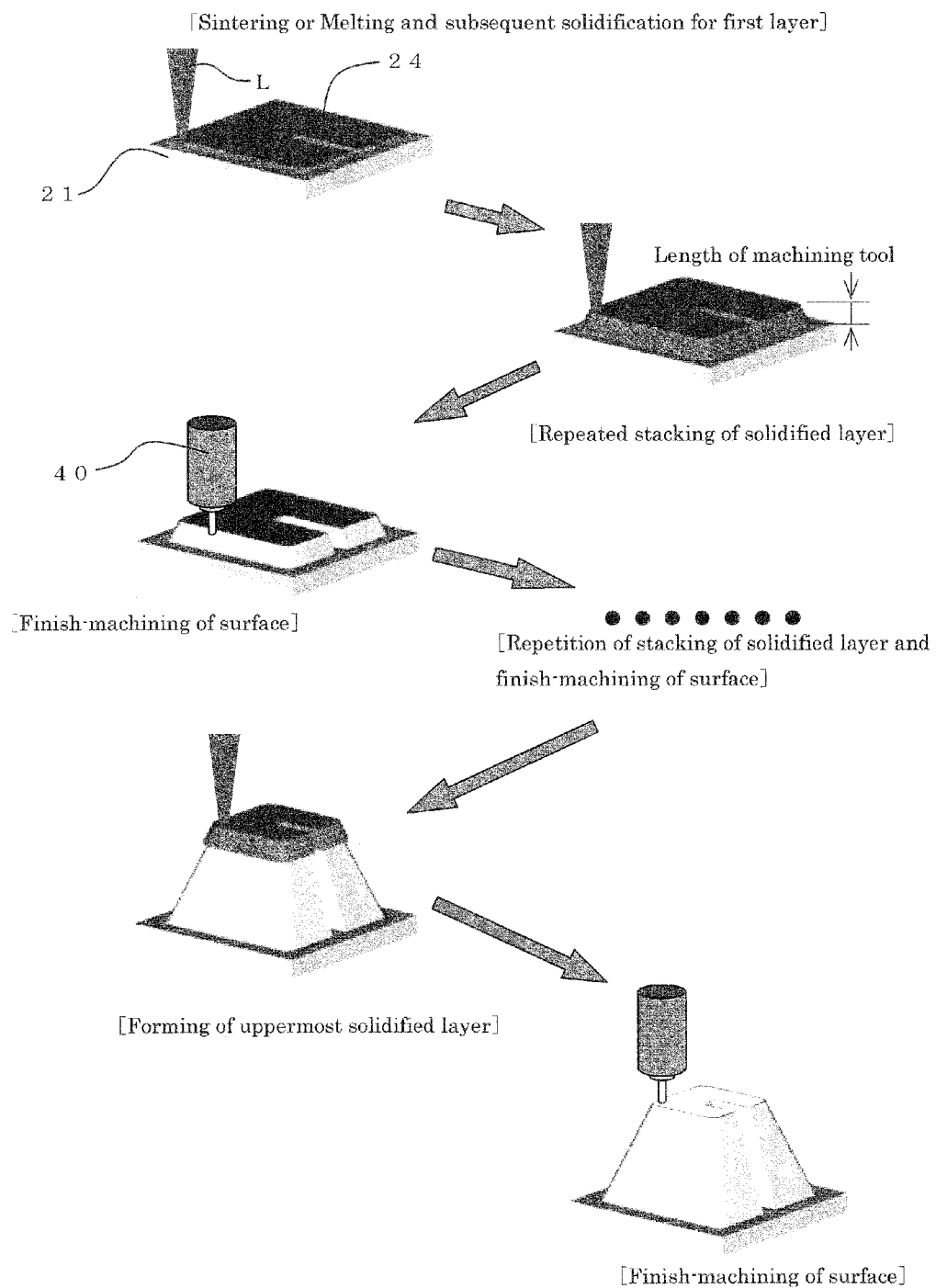
FIG. 6 includes a schematic views showing a laser-sintering/machining hybrid process over time.

Operations of the laser sintering hybrid milling machine 1 will be described in detail with reference to FIGS. 1A, 1B, 5 and 6. FIG. 5 shows a general operation flow of a laser sintering hybrid milling machine. FIG. 6 schematically and simply shows a laser-sintering/machining hybrid process.

The operations of the laser sintering hybrid milling machine are mainly composed of a powder layer forming step (S1) of forming a powder layer 22; a solidified layer forming step (S2) of irradiating the powder layer 22 with a light beam L to form a solidified layer 24; and a machining step (S3) of milling a surface of a shaped object. In the powder layer forming step (S1), first, the forming table 20 is descended by Δt1 (S11). Subsequently, a powder table 25 is elevated by Δt1, and thereafter the squeegee blade 23 is driven to move in the direction of arrow "a" as shown in FIG. 1A. This enables a powder placed on the powder table 25 to be spread to form a powder layer 22 in a predetermined thickness Δt1 (S13), while being transferred onto the base plate 21 (S12). Examples of powder include an "iron powder having a mean particle diameter of about 5 μm to 100 μm" and a "powder having a mean particle diameter of about 30 μm to 100 μm, such as a powder of nylon, polypropylene or ABS". Following this step, the solidified layer forming step (S2) is performed. In the solidified layer forming step, a light beam L is emitted from the light beam generator 30 (S21) and then a light beam L is scanned onto a desired position of the powder layer 22 by means of the galvanometer mirror 31 (S22). The scanned light beam can cause the powder to be melted and then solidified, resulting in a formation of the solidified layer 24 integrated with the base plate 21 (S23). Examples of the light beam include carbon dioxide gas laser (about 500 W), Nd:YAG laser (about 500 W), fiber laser (about 500 W) and ultraviolet light. There is no limitation on transmission of the light beam in air, and the light beam may also be transmitted through an optical fiber or the like.

The powder layer forming step (S1) and the solidified layer forming step (S2) are repeatedly performed until the thickness of the stacked layers 24 reaches such a predetermined value that is determined based on a tool length of the milling head 40 (see FIG. 1B). Upon a sintering of the powder or a melting and subsequent solidification of the powder, the newly stacked solidified layer is integrated with the solidified layer which has already been formed and located therebeneath.

When the thickness of the stacked solidified layers 24 reaches a predetermined thickness, the surface machining step (S3) is initiated. In the embodiments as shown in FIGS. 1B and 6, the milling head 40 is actuated to initiate execution of the machining step (S31). For example, in a case where the tool (ball end mill) of the milling head 40 has a diameter of 1 mm and an effective milling length of 3 mm, a milling with a milling depth of 3 mm can be performed. Therefore, when Δt1 is 0.05 mm, the milling head 40 is actuated when sixty solidified layers are formed. The milling head 40 is moved in X and Y directions by means of the X-Y actuator 41 (41a, 41b) and the shaped object composed of stacked solidified layers 24 is subjected to the surface machining (S32). When the entire three-dimensional shaped object has not yet been manufactured, the step returns to the powder layer forming step (S1). Thereafter, the steps S1 through S3 are repeatedly performed to further stack the solidified layers 24, which leads to a manufacturing of the desired three-dimensional shaped object (see FIG. 6).

An irradiation path of the light beam L in the solidified layer forming step (S2) and a milling path in the surface machining step (S3) are determined in advance using 3-D CAD data. In this case, the machining path is determined by applying contour line processing. For example, in the solidified layer forming step (S2), the contour shape data of each of sliced sections, which are regularly-pitched (e.g., 0.05 mm pitch when Δt1 is 0.05 mm) sliced sections of STL data produced from a 3-D CAD model, are used.

[Manufacturing Method of the Present Invention]

An embodiment of the present invention is characterized by features associated with the surface-machining process performed during the selective laser sintering method as described above.

The manufacturing process according to an embodiment of present invention includes at least one step of a surface-machining process for machining a surface (especially "side surface") of the solidified layer and/or the shaped object by a machining device at a point in time after the formation of the solidified layer and/or the manufacturing of the shaped object. In the manufacturing process according to an embodiment of present invention, a suction removal of the powder located around the solidified layer and/or the shaped object is performed by a suction nozzle prior to the surface-machining process, in which case a relative position relationship between the suction nozzle and the machining device is altered for the suction removal. See FIG. 7.

More specifically, the relative position relationship between a tip level "A" of the suction nozzle and a tip level "B" of the machining device is altered prior to the suction removal. Namely, at a point in time before the suction removal of the powder, a vertical relative level (i.e., relative height level) between a suction port of the suction nozzle and a machining tool of the machining device is altered.

Figure 7:
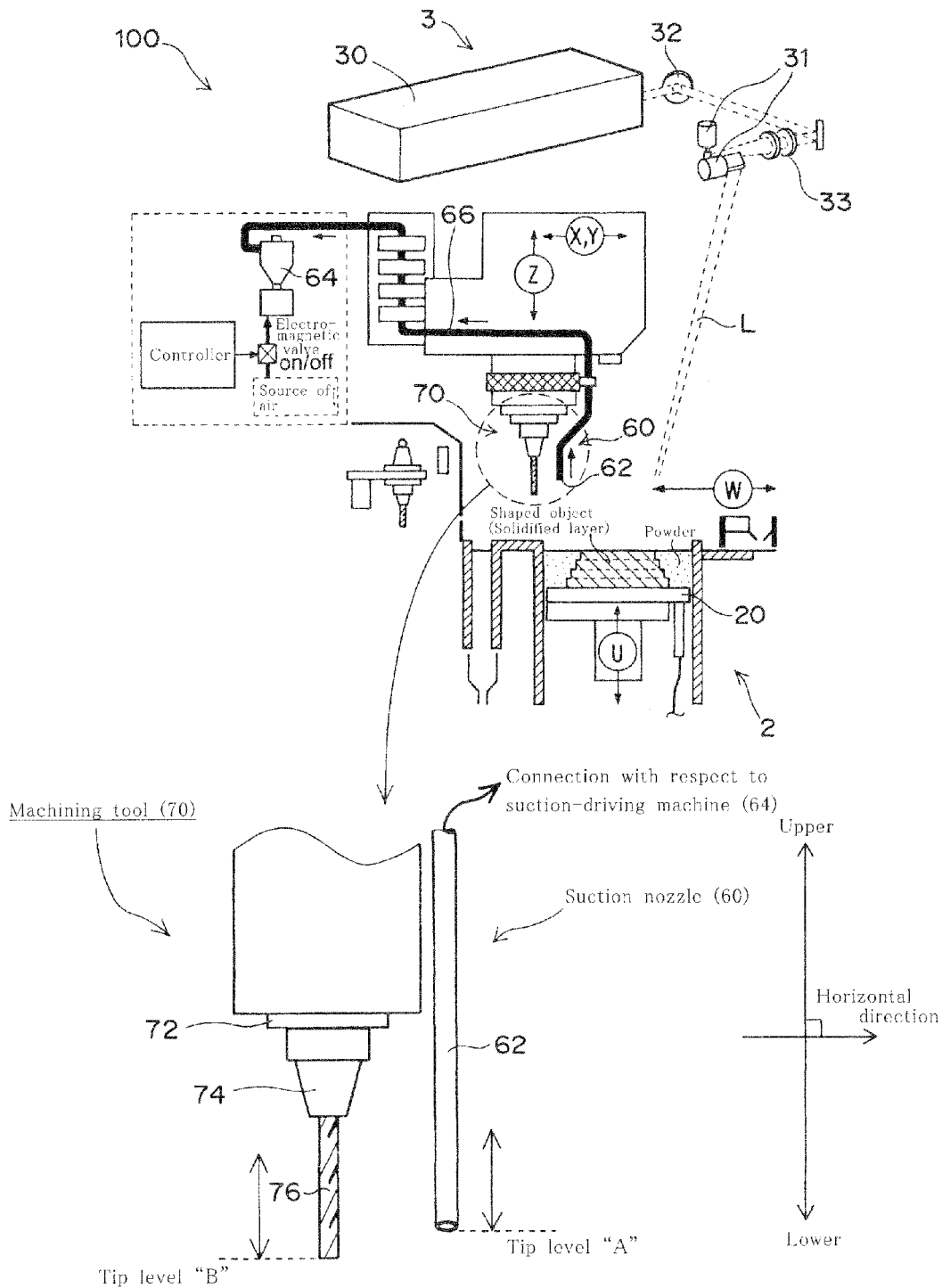
FIG. 7 includes schematic views showing a general concept according to an embodiment of the present invention wherein the general concept of the manufacturing method of the present invention and the manufacturing apparatus of the present invention are illustrated.

The term "suction nozzle" used herein means a device capable of suctioning the powder of the powder layer in the broad sense. Because of "nozzle", the suction nozzle preferably has a form of cylinder (especially "narrow cylinder") at its suction port. In this regard, the suction nozzle in an embodiment of the present invention can be referred to as "cylindrical suction device". As shown in FIG. 7 for example, the suction nozzle 60 is composed at least of a narrow cylindrical part 62 and a suction-driving machine 64 connected thereto.

Figure 8:
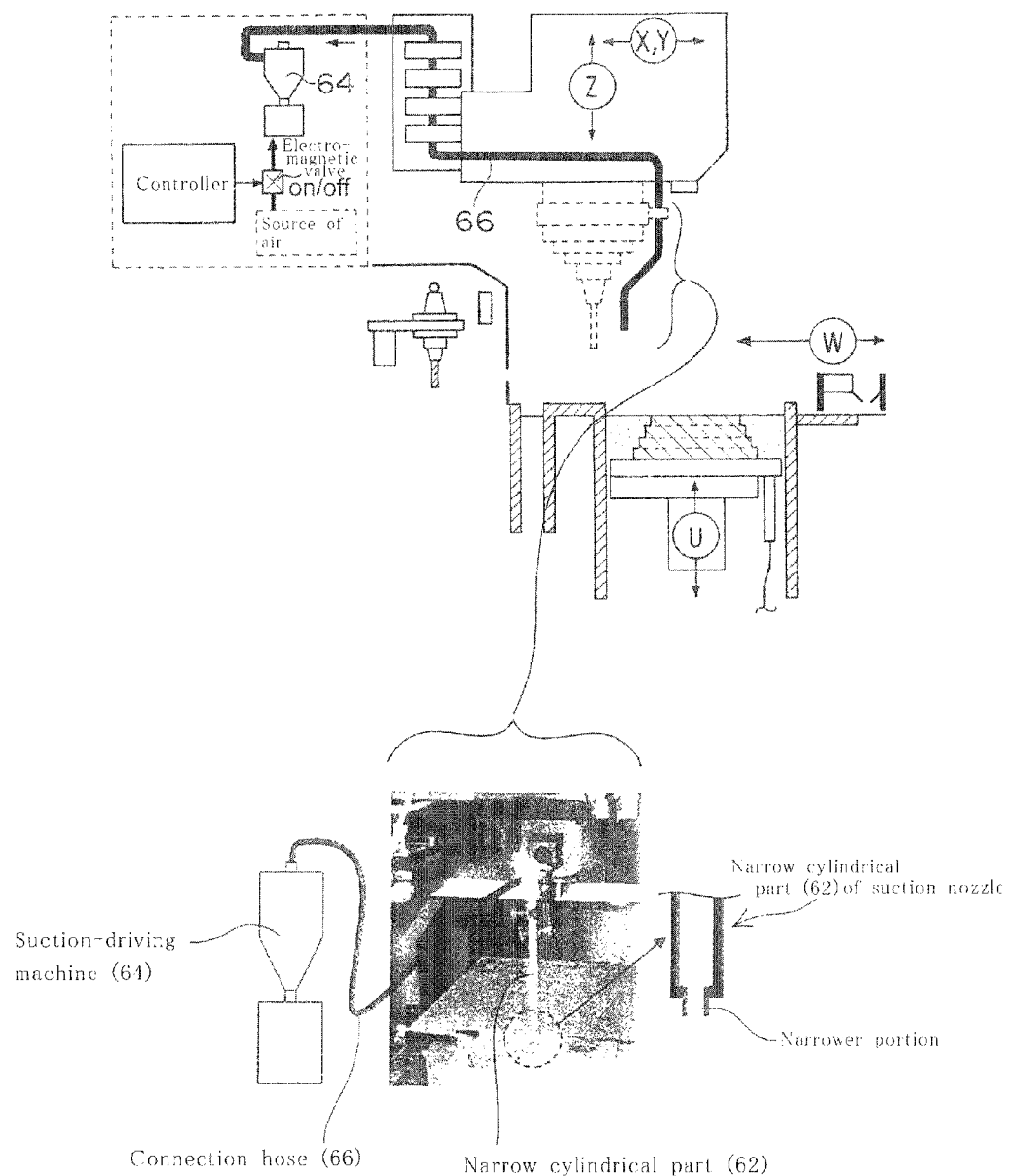
FIG. 8 includes schematic views for explaining "suction nozzle" according to an embodiment of the present invention.

The internal diameter of the narrow cylindrical part of the suction nozzle is preferably in the range of 0.5 mm to 18 mm, more preferably in the range of 1.5 mm to 15 mm, most preferably in the range of 1.8 mm to 10 mm. As shown in FIG. 8, it is preferred that the narrow cylindrical part 62 of the suction nozzle has a narrower portion at its tip side. The internal diameter of such narrower portion is preferably in the range of 0.5 mm to 5 mm, more preferably in the range of 0.5 mm to 3 mm. The narrower portion at the tip of the narrow cylindrical part of the nozzle can improve a suction efficiency due to an increased speed of the suction flow (especially the suction flow of the powder at the suction port of the nozzle).

As shown in FIG. 8, it is preferred that the narrow cylindrical part 62 is connected to the suction-driving machine 64 via a connecting hose 66. The suction-driving machine 64 may be a cyclone collector, for example. The connecting hose 66 may be a flexible hose, for example.

The term "machining device" used herein substantially means a machine capable of performing the surface-machining process with respect to the surface (especially "side surface") of the solidified layer and/or the three-dimensional shaped object produced therefrom. For example, the machining device may be a numerical control (NC: Numerical Control) machine or those analogous thereto. Specifically, it is preferred that the machining device is a machining center (MC) whose milling tool (end mill) is automatically exchangeable.

As shown in FIG. 7, the machining device 70 at least comprises "headstock 72", "tooling 74 attached to the headstock" and "machining tool 76 attached to the tooling", for example. The tooling 74 of the machining device, which is provided between the headstock 72 and the machining tool 76, serves to hold and secure the machining tool 76. From this viewpoint, the tooling in an embodiment of the present invention can be referred to as "tool holding member". The machining tool 76 of the machining device may be an end mill. As the end mill, a twin bladed ball end mill made of a superhard material, a square end mill, a radius end mill or the like may be used, for example.

The tip level "B" of the machining device substantially means a lowermost level of a machining part contributing to the surface machining directly or indirectly. More specifically, the tip level "B" corresponds to the lowermost level of the machining part composed of the headstock, the tooling and the machining tool.

It is preferred in an embodiment of the present invention that the suction nozzle and the machining device are positioned adjacent to each other. Specifically, as shown in FIG. 9, the suction nozzle 60 and the machining device 70 are preferably positioned adjacent to each other such that the axis 60a of the suction nozzle 60 and the axis 70a of the machining device 70 are approximately parallel to each other. The term "axis of suction nozzle" means the longitudinal axis of the narrow cylindrical part of the suction nozzle, for example. While on the other hand, the term "axis of machining device" means the longitudinal axis of the machining tool, the longitudinal axis of the tooling or dummy tooling, or the central axis of the headstock, for example. The phrase "positioned adjacent to each other" herein means that the spaced distance "G" or "G'" between the axis 60a of the suction nozzle 60 and the axis 70a of the machining device 70 is preferably in the range of 10 mm to 40 mm, more preferably in the range of 15 mm to 30 mm, for example (see FIG. 9B)

The suction removal prior to the surface-machining process is performed such that the suction nozzle is horizontally moved, for example. The movement of the suction nozzle is provided with no substantial change of the height level of the nozzle (i.e., vertical positioning level of the suction nozzle in the stacking direction of the solidified layers). In other words, the movement of the suction nozzle, which is above the powder layer and/or the solidified layer formed most immediately before the suction removal, is performed with no change of the spaced distance between the suction nozzle and the powder layer and/or the solidified layer in the vertical direction. In a case where the suction nozzle and the machining device are positioned adjacent to each other, the suction nozzle is used for the suction removal with the suction nozzle and the machining device being next to each other in the horizontal direction.

In the manufacturing method according to an embodiment of the present invention, the relative position relationship between the tip level "A" of the suction nozzle and the tip level "B" of the machining device is altered prior to the suction removal. The altering of the relative position relationship may be performed by the change of the configuration of the machining device, for example. More specifically, the configuration of the machining device is changed such that the tip level "B" of the machining device is higher than the tip level "A" of the suction nozzle, and thereby achieving the altered relative position relationship between the tip level "A" and the tip level "B". By way of example, the relative position relationship may be altered such that the tip level "B" of the machining device is higher than the tip level "A" of the suction nozzle by 0 mm (excluding 0 mm) to 15 mm, preferably 2 mm to 10 mm.

The term "change of configuration of machining device" used herein means an embodiment where the outline form of the machining device is changed as a whole. For example, the outline form of the machining device as a whole may be changed by changing of the element of the machining device purposely.

Figure 10A:
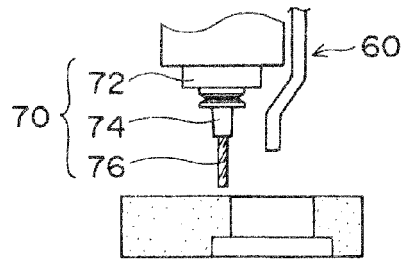
FIGS. 10A-10C are schematic views for explaining an embodiment wherein a configuration of the machining device is changed.
Figure 10B:
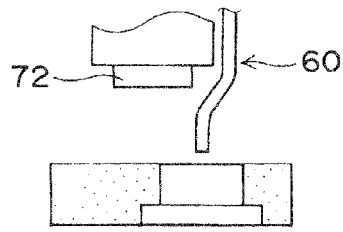

The change of the configuration of the machining device may be achieved by the partial removal of the element of the machining device. For example in a case where the machining device comprises the headstock 72, the tooling 74 and the machining tool 76, the machining device may be provided with the tooling 74 and the machining tool 76 having removed from the headstock 72, as shown in FIGS. 10A and 10B. In other words, the machining device with the tooling 74 and the machining tool 76 removed from the headstock 72 may be used for the suction removal performed by the suction nozzle. In this case, the tooling 74 and the machining tool 76 are removed from the headstock 72 in the machining device, and thereafter the suction removal by the suction nozzle is performed while keeping the removed condition of the machining device. The removal of the tooling 74 and the machining tool 76 enables the level of the whole machining device to be higher than the tip level "A" of the suction nozzle. Namely, the level of the exposed lower face of the headstock 72 is positioned above the tip level "A" of the suction level, and thereby the suction removal by the suction nozzle can be efficiently performed with being not inhibited by the machining device. For example in the case where the suction nozzle and the machining device are positioned adjacent to each other, the suction nozzle is used for the suction removal with the suction nozzle being next to the headstock of the machining device.

Figure 10C:
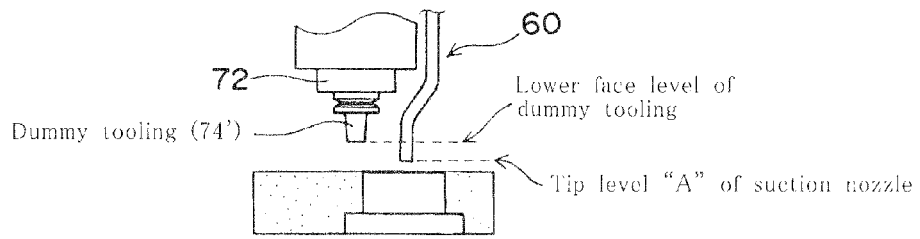
Figure 14A:
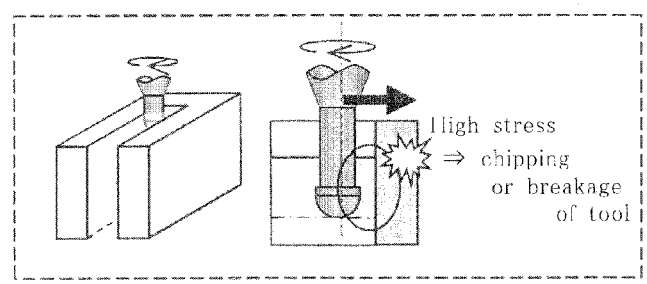
FIGS. 14A and 14B are illustrations and image showing the phenomenon found by the inventors of the present application.
Figure 14B:
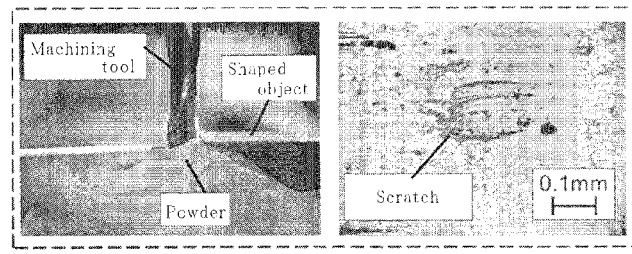

As shown in FIGS. 10A and 10C, the change of the configuration of the machining device may be achieved by the machining device with only a dummy tooling 74' attached to the headstock 72, instead of the tooling 74 and the machining tool 76 attached to the headstock 72. That is, the machining device with only the dummy tooling 74' attached to the headstock 72 may be used for the suction removal performed by the suction nozzle. This means that the dummy tooling is not provided with the end mill or the like during the suction removal, which also means that the machining device has no element/part at its lower side from the edge face of the dummy tooling.

The term "dummy tooling" used herein means a tooling for altering the relative position relationship between the suction nozzle and the machining device, not a tooling for holding the machining tool. The dummy tooling is a tooling serving to exclusively alter the relative position relationship between the suction nozzle and the machining device.

In the case of the dummy tooling, at a point in time before the suction removal, the tooling 74 and the machining tool 76 are removed from the headstock 72 of the machine device, followed by the dummy tooling 74' being attached to the headstock 72. Then, the suction removal is performed with the headstock 72 of the machining device being provided with the dummy tooling 74'. Only the dummy tooling 74' attached to the headstock in the machining device enables the level of the whole machining device to be higher than the tip level "A" of the suction nozzle. Namely, the level of the lower face of the dummy tooling 74' is positioned above the tip level "A" of the suction level, and thereby the suction removal by the suction nozzle can be efficiently performed with being not inhibited by the machining device. For example in the case where the suction nozzle and the machining device are positioned adjacent to each other, the suction nozzle is used for the suction removal with the suction nozzle being next to the dummy tooling 74' of the machining device.

Now, with reference to FIG. 11, an embodiment of the present invention will be described. The machining tool with its length corresponding to the predetermined distance P″ (i.e., the gap dimension between "tooling during the machining process" and "solidified layer formed most immediately before suction removal") or larger is used for the surface-machining process, in which case the tool number and the tool length in itself is kept constant, for example. This makes it possible to suitably subject the side surface of the solidified layer to the surface-machining process. The suction nozzle is provided under such a condition that its tip level is at least positioned above the powder layer (i.e., solidified layer) formed most immediately before the suction removal. In another case where the dummy tooling is used, the gap "H" between the lower face of the dummy tooling and the powder layer formed most immediately before the suction removal is required to be larger than the gap "I" between the tip of the suction nozzle and the powder layer formed most immediately before the suction removal. In other words, the dummy tooling has a size (dimension in the axis direction) contributing to the above.

There is no limitation on the kind of the dummy tooling 74' as long as the level of the lower face of the dummy tooling attached to the headstock is above the tip level "A" of the suction nozzle. In this regard, it is preferred that the dimension of the dummy tooling 74' in the axis direction thereof is not larger than necessary. For example, the dimension of the dummy tooling 74' in the axis direction may be the same as that of the tooling 74 (i.e., tooling used for the surface-machining)

By way of example, the dummy tooling 74' may be the same in type of that of the tooling 74. Namely, the dummy tooling 74' may be the same in type of that of the tooling used for the surface-machining. For example, as the dummy tooling 74', the tooling for the surface-machining may be used with no modification or no change thereof.

In the manufacturing method according to an embodiment of the present invention, the suction nozzle is operated in a purposeful manner to alter the relative position relationship between the tip level of the suction nozzle and the tip level of the machining device (see FIG. 12). More specifically, the suction nozzle is actuated such that the tip level "A" of the suction nozzle is lower than the tip level "B" of the machining device to alter the relative position relationship between the tip level "A" and the tip level "B". By way of example, the relative position relationship may be altered such that the tip level "A" of the suction nozzle is lower than the tip level "B" of the machining device by 0 mm (excluding 0 mm) to 15 mm, preferably 2 mm to 10 mm.

In this case, the suction nozzle is capable of moving up and down. The lowering of the suction nozzle is performed prior to the suction removal. As shown in FIG. 12, the lowering of the suction nozzle is performed such that the tip level of the suction nozzle becomes lower than the tip level of the machining device prior to the suction removal. The suction nozzle with the lowered tip thereof being maintained is used for the suction removal. Such purposeful operation of the suction nozzle also makes it possible to efficiently perform the suction removal by the suction nozzle while the removal being not inhibited by the machining device.

In both cases of "change of configuration of machining device" and "purposeful operation of suction nozzle", the suction removal can be suitably performed under such a condition that the suction port of the suction nozzle is near to the surface of the powder layer. In particular, the suction removal is preferably performed under such a condition that the spaced distance between the tip level "A" of the suction nozzle and the powder layer formed most immediately before the suction removal has a suitably adjusted distance. For example, the spaced distance in the stacking direction between the tip level "A" of the suction nozzle and the powder layer is preferably within 5 mm, i.e., preferably in the range of 0 mm (excluding 0 mm) to 5 mm, the powder layer being a layer formed most immediately before the suction removal. Such spaced distance is more preferably within 1 mm, i.e., preferably in the range of 0 mm (excluding 0 mm) to 1 mm, and most preferably in the range of 0.4 mm to 1.0 mm. As proven in FIG. 13, this makes it possible to effectively remove the powder located around the solidified layer due to the moving suction nozzle being nearer to the powder layer formed most immediately before the suction removal. It should be noted that an upper surface of "powder layer formed most immediately before the suction removal" and an upper surface of "solidified layer formed most immediately before the suction removal" are approximately flush with each other. As such, the spaced distance between the tip level "A" of the suction nozzle and the powder layer formed most immediately before the suction removal has the same meaning as that of the spaced distance between the tip level "A" of the suction nozzle and the solidified layer formed most immediately before the suction removal.

In the case where the suction nozzle and the machining device are positioned adjacent to each other, the suction nozzle is provided in such a position that it is offset from the longitudinal axis (e.g., main axis) of the machining device. In this case, the movement path of the suction nozzle during the suction process may be a path given in consideration of the amount of offset between the main axis of the machining device and the suction nozzle. Namely, the suction path of the suction nozzle may be one shifted from the movement path of the machining path by the amount of offset between the main axis of the machining device and the suction nozzle. This makes it possible to remove only the local powder which is positioned around the side surface of the solidified layer, the side surface being to be subjected to the surface-machining process.

The embodiment of the present invention can remove the powder located around the solidified layer and/or the shaped object by suction prior to the surface-machining process, and thereby making it possible to reduce the trouble in chipping or breakage of the machining tool, the chipping or breakage being attributed to the interposition of the powder between the machining tool and the surface of the shaped object. For example, the average period that elapses before the breakage or chipping of the machining tool occurs can increase by approximately 80 to 400%. By way of example, the time that elapses before the breakage or chipping of the machining tool occurs can increase from approximately the range of 30-50 hours to approximately the range of 140-150 hours. Furthermore, the embodiment of the present invention can reduce the interposition of the powder between the machining tool and the surface of the shaped object, and thereby also reducing the stress applied on the surface of the shaped object during the machining process. As a result, an improved smoothness of the surface of the shaped object can be achieved. For example, the surface roughness Rz in the surface-machined portion of the shaped object can become preferably 6 μm or less, more preferably 5 μm or less, and most preferably 4 μm or less. The term "surface roughness Rz" used herein substantially means a roughness measure which is obtained by adding up "height up to the uppermost mountain peak" and "depth down to the valley portion" from an average line in a roughness profile (i.e., in "cross-sectional profile of the surface of the solidified layer").

When the horizontal movement of the suction nozzle is provided during the suction removal according to an embodiment of the present invention, suction conditions such as suction amount and moving speed of the nozzle can be changed depending on the thickness/depth of the powder region to be suctioned. By way of example, when the thickness of the powder region to be suctioned is larger, i.e., the depth of the powder region to be suctioned is larger, the larger suction amount of the suction nozzle may be provided. Similarly when the thickness of the powder region to be suctioned is larger, i.e., the depth of the powder region to be suctioned is larger, the lower scanning speed of the suction nozzle may be provided.

Furthermore, the suction conditions such as suction amount and moving speed of the nozzle can be changed depending on the local form of the shaped object, the local form being in proximity to the suction point. By way of example, as for the wider region of the powder layer where the powder is provided widely, i.e., more powder is provided at the surrounding region (e.g., as for the vicinity region to the outer contour of the shaped object), the larger suction amount of the suction nozzle may be provided. While on the other hand, as for the narrower region of the powder layer where the powder is provided narrowly, i.e., less powder is provided at the surrounding region (e.g., as for the vicinity region to the rib of the shaped object), the smaller suction amount of the suction nozzle may be provided. Similarly as for the wider region of the powder layer (e.g., as for the vicinity region to the outer contour of the shaped object), the lower scanning speed of the suction nozzle may be provided. While on the other hand, as for the narrower portion of the powder layer where the powder is provided narrowly (e.g., as for the vicinity region to the rib of the shaped object), the higher scanning speed of the suction nozzle may be provided.

[Manufacturing Apparatus of the Present Invention]

A preferred apparatus for carrying out the manufacturing method according to an embodiment of the present invention will now be described below. As shown in FIGS. 1A, 1B, 2A, 2B, 4, 5 and 7, the apparatus according to an embodiment of the present invention comprises a powder layer former 2, a light-beam irradiator 3, a forming table 20 and a suction nozzle 60. As described in described in the above paragraphs regarding the "Selective Laser Sintering Method", the powder layer former 2 is a means for forming a powder layer, and the light-beam irradiator 3 is a means for irradiating the powder layer with an emitted light beam to form the solidified layer. The forming table 20 is a kind of platform for the formation of the powder layer and/or the solidified layer. The suction nozzle 60 is one provided for suctioning the powder of the powder layer. The "powder layer former 2", the "forming table 20", the "light-beam irradiator 3" and the "suction nozzle 60" in addition to the operation of the above device have been already discussed in the above paragraphs regarding the "Selective Laser Sintering Method", and therefore a repeated description thereof will be omitted.

In particular, the apparatus according to an embodiment of the present invention is configured to alter the relative position relationship between the tip level "A" of the suction nozzle and the tip level "B" of the machining device. The phrase " . . . configured to alter the relative position relationship" used herein substantially means an embodiment wherein the form of the machining device can be purposely changed prior to the suction removal of the powder, or an embodiment wherein the suction nozzle is capable of moving up and down. More specifically, the phrase "the form of the machining device can be purposely changed" used herein means an embodiment wherein the machining device comprises a headstock, a tooling and a machining tool, in which case the machining device additionally has a dummy tooling by which the tooling is to be replaced. Namely, the machining device is provided with a tooling exclusively used for altering the relative position relationship between the suction nozzle and the machining device, not a tooling used for holding the machining tool. And also the phrase "the suction nozzle is capable of moving up and down" used herein means an embodiment wherein the suction nozzle has a driving mechanism for moving the nozzle up and down.

More specifically, in the case where the form of the machining device can be purposely changed, the configuration of the machining device can be changed such that the tip level "B" of the machining device is higher than the tip level "A" of the suction nozzle. Similarly, in the case where the suction nozzle is capable of moving up and down, the suction nozzle can be driven such that the tip level "A" of the suction nozzle is lower than the tip level "B" of the machining device.

In the manufacturing apparatus according to an embodiment of the present invention, it is preferred that the suction nozzle and the machining device are positioned adjacent to each other. Specifically, as shown in FIGS. 9A and 9B, it is preferred that the suction nozzle 60 and the machining device 70 are positioned adjacent to each other such that the axis 60a of the suction nozzle 60 and the axis 70a of the machining device 70 are approximately parallel to each other. More preferably, the suction nozzle and the machining device are positioned such that the longitudinal axis of the narrow cylindrical part 62 of the suction nozzle and the longitudinal axis of the machining tool of the machining device are approximately parallel to each other. The term "parallel" used herein not necessarily means "exact parallel", but may be slightly offset from the exact parallel, in which case the angle "α" (see FIG. 9A) may be in the range of 0° to 10°.

Although a few embodiments of the present invention have been hereinbefore described, the present invention is not limited to these embodiments. It will be readily appreciated by those skilled in the art that various modifications/additional embodiments are possible without departing from the scope of the present invention.

For example, although "the embodiment of the changed form of the machining device" and "the embodiment of the purposeful operation of the suction nozzle" have been separately discussed, both embodiments can be provided in parallel. Namely, not only the changed form of the machining device, but also the purposeful operation of the suction nozzle can be provided as one embodiment of the present invention.

The removed powder by suction can be re-used for the manufacturing of the shaped object in an embodiment of the present invention. Namely, the removed powder by suction can be recycled. For example, the removed powder can be subjected to an automatic sieve process, followed by being returned to the storage tank for powder material.

The suction removal by suction nozzle can be performed upon the forming process of the solidified layer and/or the surface-machining process. Namely, the powder can be removed by suction during the forming process of the solidified layer and/or the surface-machining process. This makes it possible to remove a fume occurred upon the formation of the solidified layer. Such suction also makes it possible to additionally or alternatively remove the suspended powder and/or the chip, both of which may occur upon the surface-machining process.

The suction removal by suction nozzle can be performed with the adding of the inert gas to the chamber in an embodiment of the present invention. The reason for this is that the atmosphere gas (e.g., nitrogen-containing gas) is additionally suctioned by the suction nozzle during the suction removal, and thus the oxygen concentration of the chamber may increase. The adding of the inert gas to the chamber makes it possible to suitably keep the inert atmosphere gas in the chamber during the suction removal.

Industrial Applicability

The manufacturing method according to an embodiment of the present invention can provide various articles. For example, in a case where the powder layer is a metal powder layer (i.e., inorganic powder layer) and thus the solidified layer corresponds to the sintered layer, the three-dimensional shaped object obtained by an embodiment of the present invention can be used as a metal mold for a plastic injection molding, a press molding, a die casting, a casting or a forging. While on the other hand in a case where the powder layer is a resin powder layer (i.e., organic powder layer) and thus the solidified layer corresponds to the cured layer, the three-dimensional shaped object obtained by an embodiment of the present invention can be used as a resin molded article.

CROSS REFERENCE TO RELATED PATENT APPLICATION

The present application claims the right of priority of Japanese Patent Application No. 2013-144281 (filed on Jul. 10, 2013, the title of the invention: "METHOD AND APPARATUS FOR MANUFACTURING THREE-DIMENSIONAL SHAPED OBJECT"), the disclosure of which is incorporated herein by reference.

EXPLANATION OF REFERENCE NUMERALS

1 Laser-sintering/machining hybrid machine
2 Powder layer former
3 Light-beam irradiator
4 Machining means
19 Powder/powder layer (e.g., metal powder/metal powder layer or resin powder/resin powder layer)
20 Forming table (i.e., supporting table)
21 Base plate for shaped object
22 Powder layer (e.g., metal powder layer or resin powder layer)
23 Squeegee blade
24 Solidified layer (e.g., sintered layer or cured layer) or three-dimensional shaped object formed thereof
25 Powder table
26 Wall of storage tank for powder material
27 Wall of forming tank
28 Storage tank for powder material
29 Forming tank
30 Light beam generator
31 Galvanometer mirror
32 Reflecting mirror
33 Collecting lens
40 Milling head
41 X-Y actuator
41a X-axis actuator
41b Y-axis actuator
42 Tool magazine
50 Chamber
52 Window for transmission of light
60 Suction nozzle
62 Narrow cylindrical part of suction nozzle
64 Suction device (suction-driving machine)
66 Connecting hose
70 Machining device
72 Headstock
74 Tooling
76 Machining tool
100 Structural concept of manufacturing apparatus according to an embodiment of the present invention
L Light beam

The invention claimed is:

1. A method for manufacturing a three-dimensional shaped object by repetition of powder-layer forming and solidified-layer forming, the repetition comprising:
   (i) forming a solidified layer by irradiating a predetermined portion of a powder layer with a light beam, thereby sintering the powder in the predetermined portion or melting and subsequent solidification thereof; and
   (ii) forming another solidified layer by forming a new powder layer on the resulting solidified layer, followed by the irradiation of a predetermined portion of the new powder layer with the light beam,
   wherein the method includes at least a surface-machining process for machining a surface of the solidified layer and/or the shaped object by a machining device at a time after the formation of the solidified layer and/or the manufacturing of the shaped object,
   wherein, prior to the surface-machining process, a suction removal of the powder located around the solidified layer and/or the shaped object is performed by a suction nozzle,
   wherein a relative positional relationship between a tip level "A" of the suction nozzle and a tip level "B" of the machining device is altered for the suction removal so that the tip level "A" is lower than the tip level "B", and
   wherein the suction nozzle is used during the suction removal such that the suction nozzle and the machining device are positioned adjacent to each other.

2. The method according to claim 1, wherein the relative positional relationship between the tip level "A" and the tip level "B" is altered by a change of a configuration of the machining device.

3. The method according to claim 2, wherein the machining device, at a time prior to the suction removal, comprises a headstock, a tooling and a machining tool, and
   wherein the suction removal is performed such that only a dummy tooling attached to the headstock is provided in the machining device, the dummy tooling being provided only for the suction removal.

4. The method according to claim 3, wherein the dummy tooling is the same as the tooling.

5. The method according to claim 2, wherein the machining device, at a time prior to the suction removal, comprises a headstock, a tooling and a machining tool, and
   wherein the suction removal is performed such that only the headstock is provided in the machining device with the tooling and the machining tool removed therefrom, the dummy tooling being provided only for the suction removal.

6. The method according to claim 1, wherein the suction nozzle is actuated such that the tip level "A" of the suction nozzle is lower than the tip level "B" of the machining device to alter the relative positional relationship between the tip level "A" and the tip level "B".

7. The method according to claim 1, wherein the suction removal is performed such that a distance between the powder layer and the tip level "A" of the suction nozzle is within 5 mm, the powder layer being a layer formed most immediately before the suction removal.

8. An apparatus for manufacturing a three-dimensional shaped object, the apparatus comprising:
   a powder layer former for forming a powder layer;
   a light-beam irradiator for irradiating the powder layer with a light beam to form a solidified layer therefrom;
   a forming table on which the powder layer and/or the solidified layer are/is formed;
   a suction nozzle for removing at least a part of powder of the powder layer by suction; and
   a machining device for subjecting the solidified layer and the three-dimensional shaped object to a surface-machining, the shaped object being formed of the solidified layers,
   wherein the apparatus is configured to alter a relative positional relationship between a tip level "A" of the suction nozzle and a tip level "B" of the machining device so that the tip level "A" is lower than the tip level "B", and
   wherein the suction nozzle and the machining device are positioned adjacent to each other such that an axis of the suction nozzle and an axis of the machining device are approximately parallel to each other.

9. The apparatus according to claim 8, wherein the machining device comprises a headstock, a tooling and a machining tool, and
   wherein the machining device additionally has a dummy tooling with which the tooling can be replaced.

* * * * *